United States Patent
Kang et al.

(10) Patent No.: US 8,989,655 B2
(45) Date of Patent: Mar. 24, 2015

(54) METHOD IN WHICH USER EQUIPMENT TRANSMITS A SIGNAL IN A DISTRIBUTED ANTENNA SYSTEM, AND USER EQUIPMENT USING SAME

(75) Inventors: Ji Won Kang, Anyang-si (KR); Jin Young Chun, Anyang-si (KR); Su Nam Kim, Anyang-si (KR); Bin Chul Ihm, Anyang-si (KR); Sung Ho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 286 days.

(21) Appl. No.: 13/637,488

(22) PCT Filed: Mar. 23, 2011

(86) PCT No.: PCT/KR2011/001992
§ 371 (c)(1),
(2), (4) Date: Oct. 30, 2012

(87) PCT Pub. No.: WO2011/118979
PCT Pub. Date: Sep. 29, 2011

(65) Prior Publication Data
US 2013/0053050 A1  Feb. 28, 2013

Related U.S. Application Data

(60) Provisional application No. 61/317,699, filed on Mar. 26, 2010.

(30) Foreign Application Priority Data

Oct. 8, 2010 (KR) .................. 10-2010-0098373

(51) Int. Cl.
*H04B 7/14* (2006.01)
*H04B 7/02* (2006.01)
(Continued)

(52) U.S. Cl.
CPC .............. *H04B 7/024* (2013.01); *H04B 7/022* (2013.01); *H04W 52/146* (2013.01); *H04W 52/42* (2013.01); *H04W 72/042* (2013.01); *H04B 7/061* (2013.01); *H04B 7/0802* (2013.01)

USPC ................ 455/19; 455/63.4; 455/82; 455/83; 455/562.1; 455/575.7; 455/522; 455/127.1; 370/339

(58) Field of Classification Search
CPC ..... H04W 52/00; H04W 52/04; H04W 52/06; H04W 52/08; H04W 52/14; H04W 52/146
USPC .............. 455/63.4, 82, 83, 562.1, 575.7, 522, 455/127.1; 370/334, 339
See application file for complete search history.

(56) References Cited

U.S. PATENT DOCUMENTS 5,628,052 A * 5/1997 DeSantis et al. ........... 455/562.1
6,609,012 B1 * 8/2003 Malmgren et al. ......... 455/562.1
(Continued)

FOREIGN PATENT DOCUMENTS

JP  2008517558  5/2008
JP  2008154274  7/2008
(Continued)

OTHER PUBLICATIONS

Japan Patent Office Application Serial No. 2013-501188, Office Action dated Feb. 26, 2014, 5 pages.
(Continued)

*Primary Examiner* — Ronald Eisner
(74) *Attorney, Agent, or Firm* — Lee, Hong, Degerman, Kang & Waimey

(57) ABSTRACT

A method in which user equipment transmits a signal in a distributed antenna system in which a plurality of antennas is distributed in a cell, comprises the following steps: receiving uplink antenna information from a base station; controlling uplink power on the basis of the uplink antenna information; and transmitting an uplink signal on the basis of the uplink power control, wherein the uplink antenna information indicates a receiving antenna of the base station that receives the uplink signal.

14 Claims, 8 Drawing Sheets

(51) Int. Cl.
   *H04W 52/42*   (2009.01)
   *H04B 7/06*    (2006.01)
   *H04B 7/08*    (2006.01)
   *H04W 52/14*   (2009.01)
   *H04W 72/04*   (2009.01)

(56) References Cited

U.S. PATENT DOCUMENTS

| | | | |
|---|---|---|---|
| 8,229,362 B2 * | 7/2012 | Hariharan et al. | 455/63.1 |
| 8,885,751 B2 * | 11/2014 | Kang et al. | 375/267 |
| 8,891,654 B2 * | 11/2014 | Kang et al. | 375/267 |
| 2006/0084460 A1 * | 4/2006 | Matsuo et al. | 455/522 |
| 2008/0198955 A1 | 8/2008 | Oren et al. | |
| 2008/0200117 A1 | 8/2008 | Oren et al. | |
| 2008/0232305 A1 * | 9/2008 | Oren et al. | 370/328 |
| 2008/0260002 A1 | 10/2008 | Zhang et al. | |
| 2009/0322613 A1 | 12/2009 | Bala et al. | |
| 2012/0314793 A1 * | 12/2012 | Kang et al. | 375/267 |
| 2012/0314806 A1 * | 12/2012 | Kang et al. | 375/296 |

FOREIGN PATENT DOCUMENTS

| | | |
|---|---|---|
| JP | 2009021980 | 1/2009 |
| JP | 2009302959 | 12/2009 |
| JP | 2010068496 | 3/2010 |
| JP | 2012500582 | 1/2012 |
| KR | 1020090088086 | 8/2009 |
| WO | 2007/040515 | 4/2007 |

OTHER PUBLICATIONS

European Patent Office Application Serial No. 11759728.6, Search Report dated Jun. 6, 2014, 7 pages.

* cited by examiner

METHOD IN WHICH USER EQUIPMENT TRANSMITS A SIGNAL IN A DISTRIBUTED ANTENNA SYSTEM, AND USER EQUIPMENT USING SAME

CROSS-REFERENCE TO RELATED APPLICATIONS

This application is the National Stage filing under 35 U.S.C. 371 of International Application No. PCT/KR2011/001992, filed on Mar. 23, 2011, which claims the benefit of earlier filing date and right of priority to Korean Patent Application No. 10-2010-0098373, filed on Oct. 8, 2010, and also claims the benefit of U.S. Provisional Application Ser. No. 61/317,699, filed on Mar. 26, 2010, the contents of which are all hereby incorporated by reference herein in their entirety.

TECHNICAL FIELD

The present invention relates to wireless communication and, more particularly, to a method for transmitting a signal by a user equipment in a distributed antenna system, and a terminal using the method.

BACKGROUND ART

In a distributed antenna system (DAS), antennas are distributed to and disposed in various locations within a cell, and a single base station (BS) manages these antennas. A DAS is different from the conventional centralized antenna system (CAS) in which antennas localize on the center of a cell.

A DAS is differentiated from a femto cell/pico cell, a relay station, and an ad-hoc system. The DAS is different from a femto cell/pico cell in which an individual antenna constitutes a separate network, in that an individual antenna does not administer an antenna region thereof by itself but a central BS administers all the antenna regions. Also, the DAS is discriminated from a relay station or an ad-hoc system, in that respective antennas may be connected by a fixed line. Also, the DAS is differentiated from a simple repeater, in that respective antennas may transmit different signals according to a command from a BS.

An initial purpose of a DAS was to install more antennas within a cell and repeatedly transmit signals in order to cover a shadow area. Namely, initially, a DAS was mainly aimed at securing coverage. Macroscopically, a DAS may be considered as a type of multi-input multi-output (MIMO) system in that antennas may simultaneously transmit or receive a plurality of data streams to support one or a plurality of users. A MIMO system is recognized as a system satisfying next-generation communication due to high spectral efficiency. In the point of view of a MIMO system, a DAS has more advantages than that of a CAS. For example, a distance between users and antennas is reduced to have high power efficiency, a channel capacity is increased due to low correlation and interference between antennas, and relatively uniform quality of communication can be secured irrespective of a user location within a cell.

Namely, a DAS having the foregoing advantages may be advantageous for implementing a MIMO system in order to secure a high data capacity required in the present and future communication standards, and is required to perform MIMO transmission. For example, it may be required to perform rank-2 transmission or higher to a single user equipment (UE) (it is known as a single user (SU)-MIMO) in the same frequency domain. Or, a multi-user (MU)-MIMO simultaneously supporting multiple UEs may be required. Such necessity may also be required in uplink, as well as in downlink.

The foregoing SU-MIMO and MU-MIMO are essentially required in IEEE 802 and 3GPP LTE as standardization groups, and in actuality, standards such as IEEE (Institute of Electrical and Electronics Engineers) 802.16e/m, 3GPP ($3^{rd}$ generation partnership project) LTE (long term evolution) Release 8/9, and the like, deal with SU-MIMO and MU-MIMO. However, currently, communication standards are designed on the premise of a CAS, so they cannot be applied as is to a DAS employing an advanced technique such as a MIMO technique. Thus, a communication standard supporting a DAS is required, and also, a method for transmitting a signal of a terminal (or a user equipment (UE)) based on such a communication standard and a UE using the method are required.

Technical Problem

An aspect of the present invention provides a method for transmitting a signal by a terminal (or a user equipment (UE)) and a terminal using the same in a distributed antenna system.

Technical Problem

According to an aspect of the present invention, there is provided a method for transmitting a signal by a terminal in a distributed antenna system (DAS) in which a plurality of antennas are distributedly disposed in a cell, including: receiving uplink antenna information from a base station (BS); controlling uplink power based on the uplink antenna information; and transmitting an uplink signal based on the uplink power control, wherein the uplink antenna information indicates a reception antenna of the BS for receiving the uplink signal.

The method may further include: receiving downlink antenna information from the BS; and generating downlink channel state information based on the downlink antenna information, wherein the downlink antenna information indicates a transmission antenna through which the BS transmits a downlink signal to the terminal.

The uplink antenna information may indicate an antenna indicated by the downlink antenna information and at least one additional antenna.

The uplink antenna information may include only an antenna index of the at least one additional antenna.

The uplink signal may include the downlink channel state information.

The downlink antenna information may indicate an antenna indicated by the uplink antenna information and at least one additional antenna.

The downlink antenna information may include only an antenna index of the at least one additional antenna.

The terminal may adjust uplink transmission power by using an average of path losses with respect to reception antennas indicated by the uplink antenna information.

The uplink antenna information may include an antenna index of the reception antenna.

The uplink antenna information may include an index of a reference signal transmitted through the reception antenna.

According to another aspect of the present invention, there is provided a method for transmitting a signal by a terminal in a distributed antenna system (DAS) in which a plurality of antennas are distributedly disposed in a cell, including: receiving a downlink reference signal from a base station (BS); selecting a preferred antenna group by using the downlink reference signal; feeding back information regarding the preferred antenna group to the BS; receiving downlink antenna information from the BS; controlling uplink power on the assumption that the preferred antenna group is a reception antenna of the BS; and transmitting an uplink signal to the BS, wherein the uplink signal is transmitted to an antenna included in the preferred antenna group.

According to another aspect of the present invention, there is provided a terminal including: an RF unit configured to transmit and receive an RF signal; and a processor connected to the RF unit, wherein the processor receives uplink antenna information from a base station (BS), controls uplink power based on the uplink antenna information, and transmits an uplink signal based on the controlled power, wherein the uplink antenna information indicates a reception antenna of the BS for receiving the uplink signal.

The processor may further receive downlink antenna information from the BS and generate downlink channel state information based on the downlink antenna information, wherein the downlink antenna information indicates a transmission antenna through which the BS transmits a downlink signal.

Advantageous Effects

According to embodiments of the present invention, in a distributed antenna system (DAS), although a transmission antenna set for a base station (BS) to transmit a signal to a terminal therethrough and a reception antenna set for receiving a signal from the terminal are different, signals can be effectively transmitted and received between the BS and the terminal. Also, unnecessary power consumption can be reduced.

BEST MODE

The following technique may be used for various multiple access schemes such as CDMA (code division multiple access), FDMA (frequency division multiple access), TDMA (time division multiple access), OFDMA (orthogonal frequency division multiple access), SC-FDMA (single carrier-frequency division multiple access), and the like. CDMA may be implemented as a radio technology such as UTRA (Universal Terrestrial Radio Access) or CDMA2000. TDMA may be implemented as a radio technology such as GSM (Global System for Mobile communications)/GPRS (General Packet Radio Service)/EDGE (Enhanced Data Rates for GSM Evolution). OFDMA may be implemented as a radio technology such as IEEE 802.11 (Wi-Fi), IEEE 802.16 (WiMAX), IEEE 802-20, E-UTRA (Evolved UTRA), and the like. UTRA is a part of UMTS (Universal Mobile Telecommunications System). 3GPP (3rd Generation Partnership Project) LTE (long term evolution) is part of E-UMTS (Evolved UMTS) using E-UTRA, which employs OFDMA in downlink and SC-FDMA in uplink. LTE-A (Advanced) is an advancement of LTE. IEEE 802.16m is an advancement of IEEE 802.16e.

Figure 1:
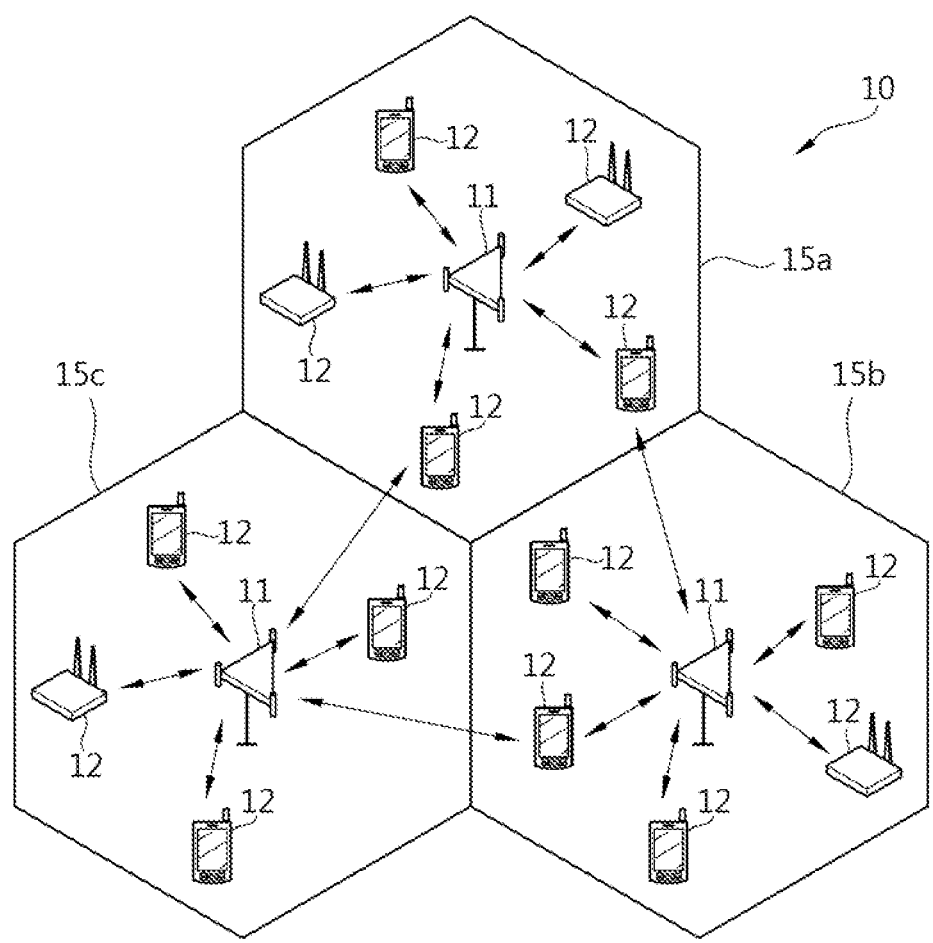
FIG. 1 is a block diagram illustrating a wireless communication system.

FIG. 1 illustrates a wireless communication system.

Referring to FIG. 1, the wireless communication system 10 includes at least one base station (BS) 11. Each BS 11 provides a communication service to particular geographical areas (which are generally called cells) 15a, 15b, and 15c. Each of the cells may be divided into a plurality of areas (or sectors). A user equipment (UE) 12 may be fixed or mobile and may be referred to by other names such as mobile station (MS), user terminal (UT), subscriber station (SS), wireless device, personal digital assistant (PDA), wireless modem, handheld device, etc. The BS 11 generally refers to a fixed station that communicates with the UE 12 and may be called by other names such as evolved-nodeB (eNB), base transceiver system (BTS), access point (AP), etc.

Hereinafter, downlink refers to a communication link from a BS to a UE, and uplink refers to a communication link from a UE to a BS. In downlink, a transmitter may be a part of a BS, and a receiver may be a part of a UE. In uplink, a transmitter may be a part of a UE, and a receiver may be a part of a BS.

A BS or a UE may support multiple antennas. Namely, a transmitter may use a plurality of transmit antennas, and a receiver may use a plurality of receive antennas. A transmit antenna refers to a physical or logical antenna used to transmit a single signal or stream, and a receive antenna refers to a physical or logical antenna used to transmit a single signal or stream. When a transmitter and a receiver uses a plurality of antennas, the wireless communication system may be called a MIMO (multiple input multiple output) system.

A MIMO system may use various transmission techniques. A transmission technique refers to a scheme of transmitting downlink data by a BS to a terminal. The MIMO transmission technique includes transmit diversity, spatial multiplexing, beamforming, and the like. The transmit diversity is a technique that multiple transmission antennas transmits the same data to thus enhance a transmission reliability. Spatial multiplexing is a technique that multiple transmission antennas simultaneously transmit different data to thus transmit high speed data without increasing a bandwidth of a system. Beamforming is used to increase a signal to interference plus noise ratio (SINR) of a signal by adding a weight value according to a channel state in multiple antennas. In this case, the weight value may be represented by a weight vector or a weight matrix, and it is known as a precoding vector or a precoding matrix.

Spatial multiplexing includes spatial multiplexing for a single user and spatial multiplexing for multiple users. The spatial multiplexing for a single user is called a single user MIMO (SU-MIMO), and the spatial multiplexing for multiple users is called spatial division multiple access (SDMA) or multi-user MIMO (MU-MIMO).

The MIMO transmission technique may be semi-statically set by a higher layer signal such as an RRC (radio resource control) message.

Figure 2:
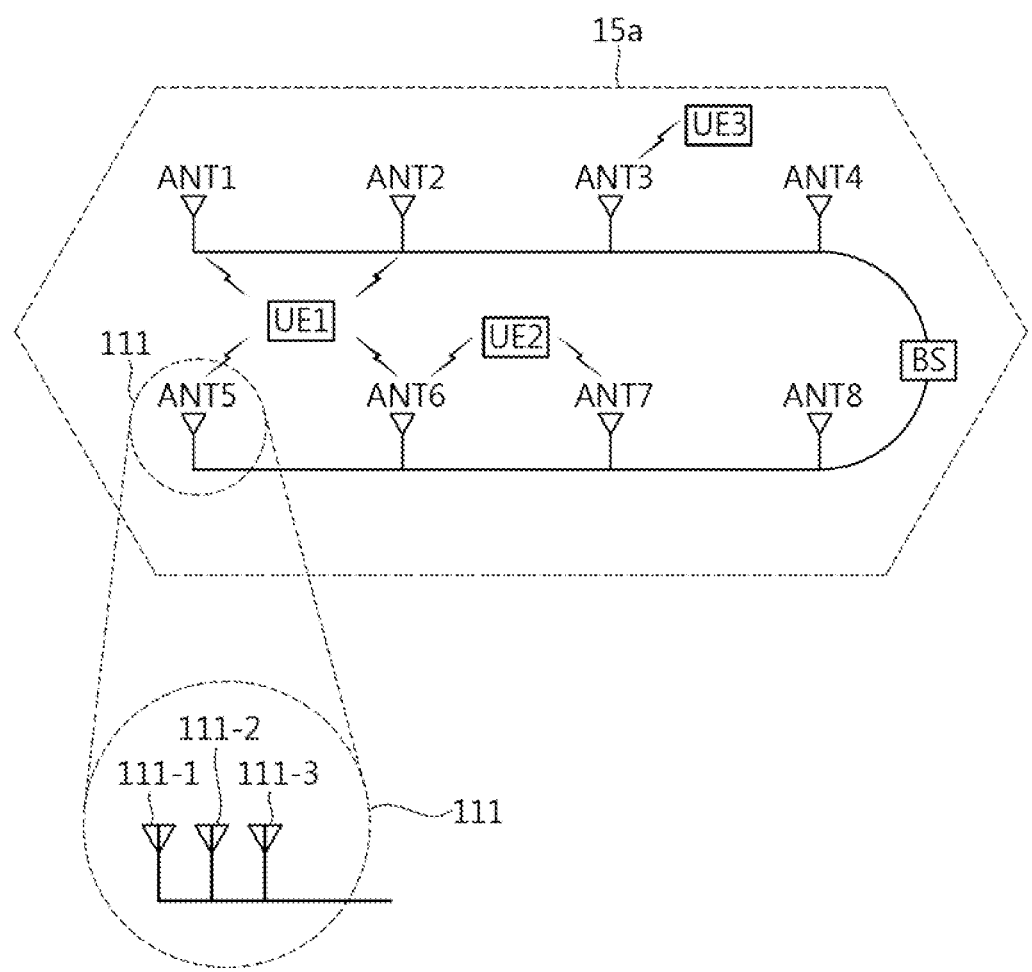
FIG. 2 is a view illustrating a distributed antenna system.

FIG. 2 is a view illustrating a distributed antenna system.

Referring to FIG. 2, a distributed antenna system (DAS) includes a BS and a plurality of BS antennas (e.g., ANT1 to ANT8, which are referred to as BS antennas, hereinafter). The antennas ANT1 to ANT8 may be connected to the BS through a fixed line or wirelessly. Unlike a centralized antenna system (CAS), in the DAS, the antennas are distributed to and disposed in various locations within a cell, rather than crowding in the center of the cell. Each of the antennas may exist in each separated place within a cell, or several antennas may be distributed in a congregated form in each separated place within the cell. For example, the antenna 5 111 may include a plurality of antennas 111-1, 111-2, and 111-3, rather than being configured as a single antenna. A plurality of antennas congregated areally may be called an antenna node. Namely, the antenna 5 111 is an antenna node. Antennas included in a single antenna node may be located within a few meters geographically, so in the position of a UE, they may be seen to belong to the same area. Each antenna node serves as an access point a UE may access. Hereinafter, an antenna may be used to have a meaning that it includes an antenna node, as well as a single antenna.

Antennas may be distributed such that antenna coverages thereof overlap to allow for a rank-2 or higher order transmission. Namely, antenna coverage of each antenna may reach even at least one adjacent antenna. In this case, UEs existing within the cell may have strength of signals variably changing when the signals are received from a plurality of antennas according to locations thereof within the cell, a channel state, and the like.

Referring to the example of FIG. 2, a UE1 may receive signals having good reception sensitivity from antennas 1, 2, 5, and 6. Meanwhile, signals transmitted from antennas 3, 4, 7, and 8 may insignificantly affect the UE1 due to a path loss. A UE2 may receive signals having good reception sensitivity from antennas 6 and 7, and is insignificantly affected by signals transmitted from the other remaining antennas. Similarly, in the case of a UE3, it may receive a signal having good reception sensitivity only from an antenna 3, and signals from the other remaining antennas may have strength weak enough to be negligible.

As discussed in the above example, in the DAS, it may be easy to perform MU-MIMO communication on the UEs separated from each other within a cell. Namely, in the above example, communication to the UE1 may be performed through the antennas 1, 2, 5, and 6, communication to the UE2 may be performed through the antenna 7, and communication to the UE3 may be performed through the antenna 3. Antennas 4 and 8 may transmit signals for the UE2 or UE3 or may not transmit any signal. Namely, the antennas 4 and 8 may be operated in an OFF state according to circumstances. The number of transmission ranks or the number of transmission layers (i.e., the number of transmission streams) with respect to the UE1, UE2, and UE3 may differ. For example, when the UEs have two reception antennas, rank-2 transmission may be performed on the UE1 and rank-1 transmission may be performed on the UE2 and UE3.

As described above, when SU-MIMO/MU-MIMO communication is performed in a DAS, various transmission layers may exist per UE, and different antennas (or antenna groups) may be allocated to respective UEs. In other words, in a DAS, particular antennas may be supported for each UE. Antennas supported for each UE may be changed over time.

Hereinafter, a method for transmitting and receiving signals between a base station (BS) and a user equipment (UE) applicable in a distributed antenna system will be described.

Figure 3:
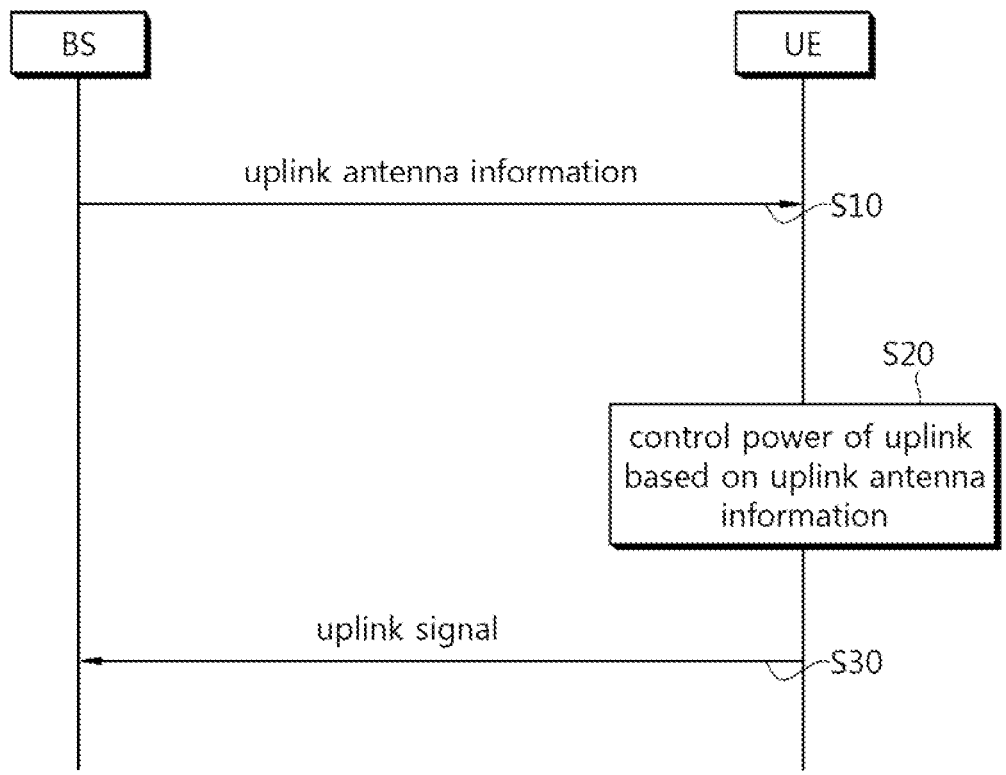
FIG. 3 is a view illustrating a method for transmitting and receiving signals between a BS and a UE according to an embodiment of the present invention.

FIG. 3 is a view illustrating a method for transmitting and receiving signals between a BS and a UE according to an embodiment of the present invention.

Referring to FIG. 3, a BS transmits uplink antenna information to a UE (S10).

Here, the uplink antenna information refers to information indicating an antenna or an antenna node through which the BS receives an uplink signal transmitted from the UE. In an existing CAS system, when a UE enters a cell through initial cell entering, cell re-entering, handover, or the like, the BS informs the UE only about the number of transmission antennas of the BS. In comparison, in an embodiment of the present invention, the BS provides uplink antenna information, by which each UE can recognize an antenna (or an antenna node) for receiving an uplink signal, to each antenna. Uplink antenna information may be unicast to each UE.

The UE performs uplink power control based on the uplink antenna information (S20). As mentioned above, unlike a CAS, in the DAS, antennas of the BS are distributedly disposed in a cell. Thus, a difference between path losses of respective antennas may not be negligible. Namely, there is a difference in transmission efficiency, transmission power of a particular UE, and the like, according to through which antenna an uplink signal of the particular UE is received. The UE may reduce battery consumption by performing uplink power control based on the uplink antenna information.

The UE transmits an uplink signal to the BS (S30). Here, the uplink signal may be a bandwidth request signal. When the UE has data to be transmitted to uplink, the UE performs a process of requesting a bandwidth from the BS. Although not shown, the bandwidth request process may include (1) transmitting by the UE a band request signal, (2) transmitting by the BS a response message with respect to the band request signal, (3) transmitting by the UE a band request message, (4) transmitting by the BS an uplink grant message, and (5) transmitting by the UE uplink data.

Figure 4:
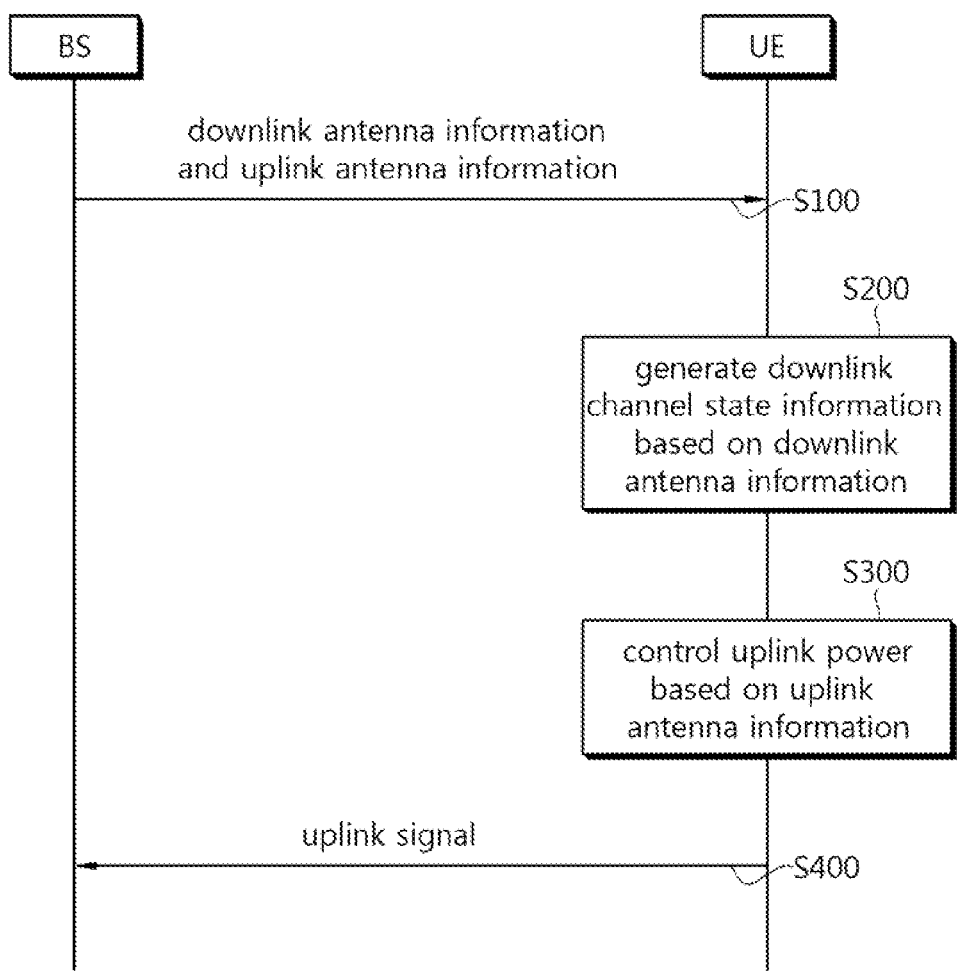
FIG. 4 is a view illustrating a method for transmitting and receiving signals between a BS and a UE according to an embodiment of the present invention.

FIG. 4 is a view illustrating a method for transmitting and receiving signals between a BS and a UE according to an embodiment of the present invention.

Referring to FIG. 4, the BS transmits downlink antenna information and uplink antenna information to the UE (S100). Here, the downlink antenna information refers to information indicating an antenna or an antenna node through which the BS transmits a downlink signal to the UE. The uplink antenna information refers to information indicating an antenna or an antenna node through which the BS receives an uplink signal transmitted from the UE as mentioned above. The uplink antenna information and the downlink antenna information may be transmitted to the UE simultaneously or separately. Also, although not shown in FIG. 3, each antenna or each antenna node may transmit a reference signal for measuring and estimating a channel. The reference signal, a signal the BS and the UE know in advance, may be called by other names such as pilot or midamble.

The UE measures or estimates a downlink channel based on the downlink antenna information to generate downlink channel state information (S200). The downlink channel state information may include, for example, a CQI (channel quality indicator), an RI (rank indicator), a PMI (precoding matrix indicator), and the like. For example, when antennas indicated by the downlink antenna information are antenna 1 and antenna 2, the UE may generate channel state information with respect to the antenna 1 and the antenna 2. Here, the UE may measure a reference signal by measuring reference signals transmitted from the antenna 1 and the antenna 2.

The UE may perform uplink power control based on the uplink antenna information (S300).

In the DAS, an antenna set (a transmission antenna set) through which a BS transmits a downlink signal with respect to a particular UE and an antenna set (a reception antenna set) through which the BS receives an uplink signal transmitted from the particular UE is received may be different. For example, in downlink, antenna 1 may transmit a downlink signal to UE1, antenna 2 may transmit a downlink signal to UE2, antenna 3 may transmit a downlink signal to UE3, and antenna 4 may transmit a downlink signal to UE4. Meanwhile, in uplink, antenna 1 to antenna 4 may receive all of the respective uplink signals transmitted from UE1 to UE4. In this case, with respect to a particular UE, e.g., UE1, a transmission antenna set may include only antenna 1, and a reception antenna set may include antenna 1 to antenna 4. Namely, the transmission antenna set and the reception antenna set may be different.

In general, uplink power control is used to periodically calibrate uplink transmission power, for initial power calibration or data loss prevention. Uplink transmission power of a UE may be expressed, for example, by Equation 1 shown below.

$$P(\text{dBm}) = L + SINR_{Target} + NI + \text{Offset} \quad \text{[Equation 1]}$$

In Equation 1, 'L' may include a path loss, a shade loss, or the like, as a downlink propagation loss, estimated by a UE. '$SINR_{Target}$' is a target SNR value with respect to a channel or resource desired to be transmitted. 'NI' is a power amount of average noise and interference estimated by the BS, which is transferred to the UE through a downlink control channel. 'Offset' is a power control adjustment value estimated by the BS or the UE.

When a BS and/or a UE support(s) multiple antennas in a CAS system, average values with respect to the pertinent multiple antennas may be used as the respective values of Equation 1. This is because, in the CAS system, multiple antennas are locally concentrated to be disposed, so it may be assumed that channel characteristics of the respective antennas are not greatly different or negligible. However, in the DAS, channel characteristics, e.g., path losses, of the respective antennas may be too different to be negligible. Thus, 'L' value in Equation 1 estimated by the UE with respect to the transmission antenna set and 'L' value in Equation 1 estimated by the UE with respect to the reception antenna set may be too different to be negligible.

For example, in case that the UE1 determines uplink transmission power in the DAS, if the UE1 determines uplink transmission power by averaging path losses with respect to the transmission antenna set, it may fail to count a path loss with respect to an antenna (or an antenna node) supporting a different UE in downlink transmission although the antenna is geographically present in the vicinity of the UE1. Thus, the UE1 may excessively boost uplink transmission power to exceed an actually desired quality level. This increases power consumption of the UE1 and also increases interference to uplink transmission of a different adjacent UE as well.

In another example, in case that the UE1 averages path losses with respect to all the antennas of the BS, namely, all the antennas distributedly disposed in a cell, the UE1 may count even an antenna that does not receive a signal of the UE1 in actuality in calculating a path loss. In such a case, uplink transmission power calculated by the UE1 is highly unlikely to reach a desired quality level.

Thus, in order to solve the problem, the UE1 may determine uplink transmission power by averaging path losses with respect to a reception antenna set indicated in the uplink antenna information.

The UE transmits an uplink signal to the BS (S400). The uplink signal may include downlink channel state information as mentioned above, control information such as ACK (acknowledgement)/NACK (not-acknowledgement), user data, and the like.

In the DASE, a reception antenna set may include a transmission antenna set. For example, when the UE1 is geographically located in the vicinity of antenna 1, antenna 2, antenna 5, and antenna 6, the BS may be restricted to transmit a downlink signal with respect to the UE1 only through antenna 1, antenna 2, and antenna 5 due to the UE2. Meanwhile, in uplink transmission, an uplink signal transmitted by the UE1 may affect all the antenna 1, antenna 2, antenna 5, and antenna 6. In such a case, a transmission antenna group of the BS with respect to the UE1 is {antenna 1, antenna 2, antenna 5}, and a reception antenna group of the BS is {antenna 1, antenna 2, antenna 5, antenna 6}. Namely, the reception antenna group includes the transmission antenna group.

In such a case, an information amount (e.g., an amount of transmitted bits) of uplink antenna information and downlink antenna information may be reduced by using correlation therebetween. In the foregoing example, the downlink antenna information may include antenna indices of antenna 1, antenna 2, and antenna 5, and the uplink antenna information may include only an antenna index of antenna 6. Namely, the uplink antenna information may include only the information regarding an antenna added to the downlink antenna information. Such a rule, namely, the rule that uplink antenna information should include information regarding an antenna added to antennas indicated in the downlink antenna information, may be agreed between the BS and the UE in advance, or the BS may explicitly inform the UE about that.

Alternatively, when power restriction of the UE is great, the number of antennas (or antenna nodes) included in the uplink antenna information may be smaller than that of antennas (or antenna nodes) included in the downlink antenna information. This is because, when the power restriction of the UE is great, coverage affected by an uplink signal may be very smaller than that affected by a downlink signal. In this case, an antenna or an antenna node of a reception antenna group may be included in antennas or antenna nodes of a transmission antenna group. In this case, on the contrary to the foregoing example, the downlink antenna information may include only information regarding the antenna added to the uplink antenna information.

Figure 5:
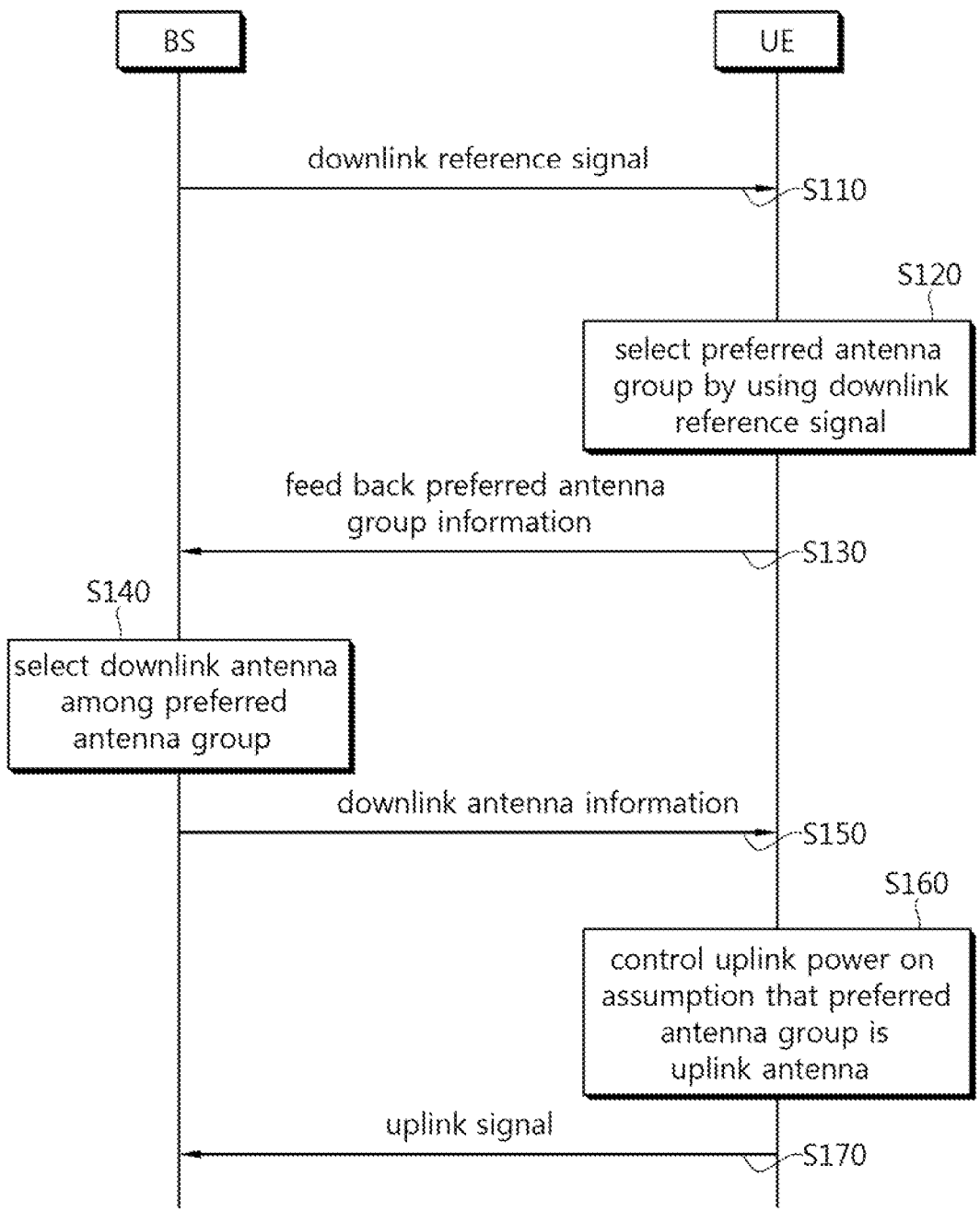
FIG. 5 is a view illustrating a method for transmitting and receiving signals between a BS and a UE according to another embodiment of the present invention.

FIG. 5 is a view illustrating a method for transmitting and receiving signals between a BS and a UE according to another embodiment of the present invention.

Referring to FIG. 5, the BS transmits a downlink reference signal differentiated for each antenna or antenna node (S100). The UE selects a preferred antenna group by using a downlink reference signal (S120). For example, the UE may select antenna 1, antenna 2, antenna 5, and antenna 6 having an excellent channel state as a preferred antenna group, among antenna 1 to antenna 8 distributedly disposed in a cell.

The UE feeds back the preferred antenna group information to the BS (S130). The preferred antenna group information includes information indicating the foregoing preferred antenna group. The BS sets a downlink antenna for actually transmitting a downlink signal to the UE among the antennas or antenna nodes included in the preferred antenna group (S140). The downlink antenna may correspond to the foregoing transmission antenna set. The BS transmits the downlink antenna information to the UE (S150). The downlink antenna information is information indicating a downlink antenna for actually transmitting a downlink signal to the UE.

The UE may recognize a transmission antenna set through the downlink antenna information. If the transmission antenna set is a subset of the preferred antenna group selected by the UE, the UE may perform uplink power control on the assumption that the preferred antenna group is an uplink antenna (i.e., a reception antenna set) through which the BS is to receive an uplink signal) (S160), and transmits an uplink signal to the BS (S170).

In the methods described above with reference to FIGS. 4 and 5, the uplink antenna information or downlink antenna information may be explicitly given in the form of index information of the antennas or the antenna nodes.

Alternatively, the uplink antenna information or the downlink antenna information may be implicitly given. For example, the uplink antenna information or the downlink antenna information may be given as index information of a reference signal (which may be called by other names such as midamble, pilot, or the like) to be used by the UE in calculating a path loss to determine uplink transmission power. The UE may know a reception antenna group by using the uplink antenna information given in the form of the reference signal index.

Also, the uplink antenna information may be unicast only to a particular UE. For example, the BS may transmit uplink antenna information through a resource region allocated to a particular UE or mask an ID (identification) of the particular UE to a CRC (cyclic redundancy check) and transmit the same. The CRC serves to detect an error of a message transmitted by the BS. The uplink antenna information may be unicast by masking the ID of the particular UE to the CRC added to uplink antenna information transmitted to the particular UE.

Figure 6:
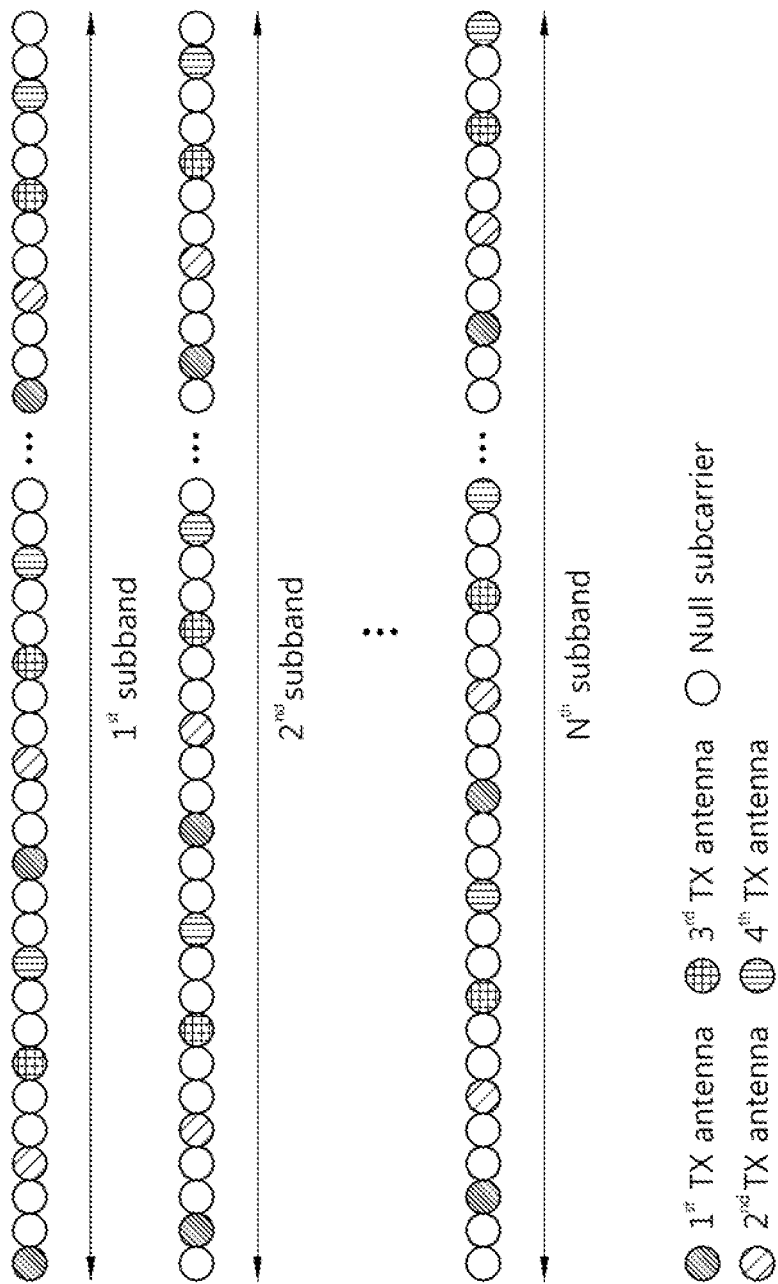
FIGS. 6 and 7 are views illustrating an example of a reference signal transmitted by each antenna, respectively.
Figure 7:
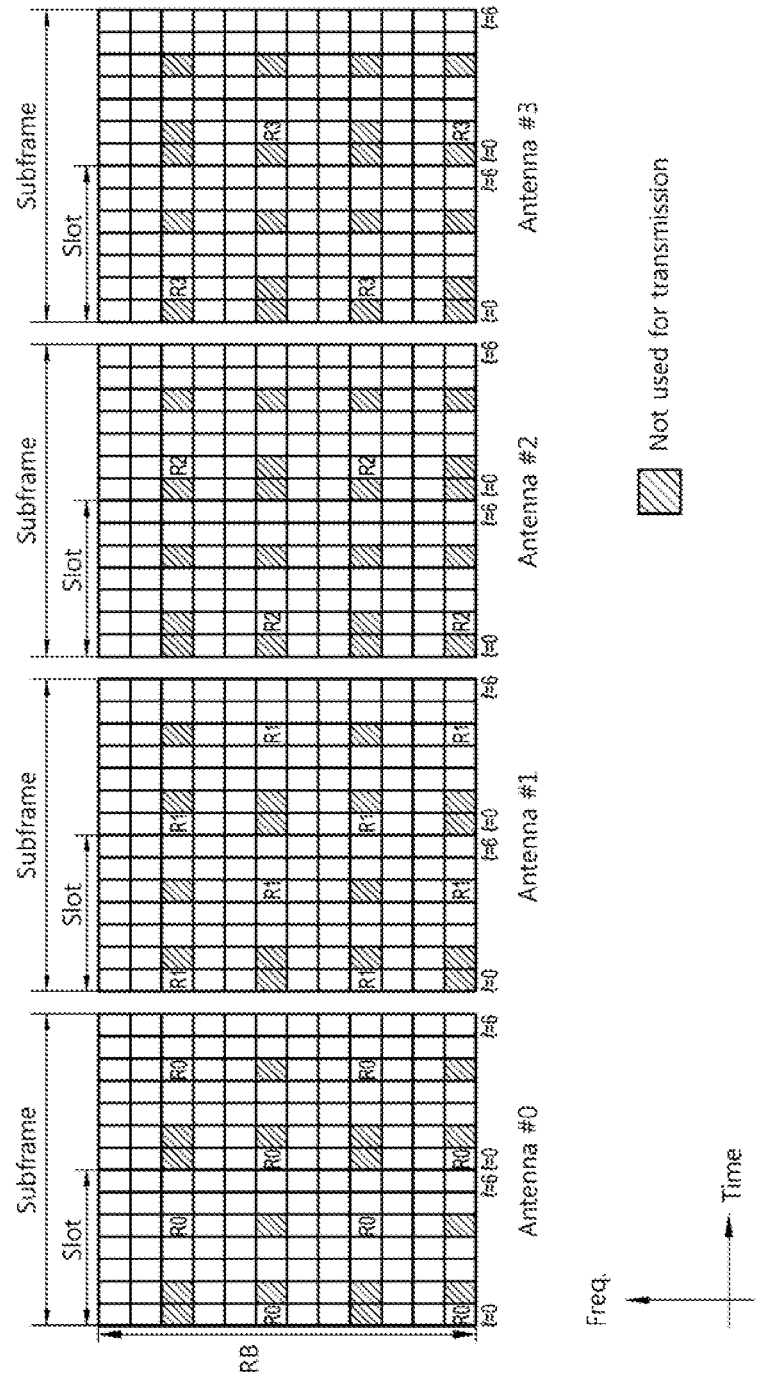

FIGS. 6 and 7 are views illustrating an example of a reference signal transmitted by each antenna, respectively.

FIG. 6 shows an example of reference signal patterns that may be used when four antennas are included in a DAS. This may be used when the DAS follows the IEEE 802.16m and standard. Referring to FIG. 6, reference signal patterns with respect to a single antenna are mapped to positions of subcarriers spaced apart from each other by the same interval in a particular OFDMA symbol of a single frame. Four midamble patterns are transmitted in the same OFDMA symbol such that they are disposed not to overlap with each other in a frequency domain. Namely, the BS transmits four midamble patterns using different frequency resources in the same OFDMA symbol. FIG. 6 illustrates the case of four antennas, but the present invention is not limited thereto and the number of antennas may extend to N (N is a natural number greater than 4) number of antennas.

The reference signal of FIG. 7 may be used when the DAS follows a standard such as LTE/LTE-A. In FIG. 7, Rp indicates a resource element used for transmitting a reference signal through an antenna #p (p=0, 1, 2, 3). A resource element used for transmitting a reference signal is called a reference signal resource element. Rp is a reference signal resource element with respect to an antenna #p. Rp is not used for any transmission through any other antennas than the antenna #p. In other words, a resource element used for transmitting a reference signal through a certain antenna within a substrate may not be used for any transmission through any other antennas in the same subframe and may be set to 0. This is not to cause interference between or among antennas. In FIG. 6, four antennas are illustrated, but the present invention is not limited thereto and the number of antennas may extend to M (which is a natural number greater than 4) number of antennas, and in this case, the M number of antennas are disposed such that reference signal resource elements do not overlap with each other.

The present invention may also be applied to a DAS using multiple carriers.

An existing 3GPP LTE system supports a case in which a downlink bandwidth and an uplink bandwidth are set to be different, but it is premised on a single carrier. Namely, the 3GPP LTE system supports only a case in which a downlink bandwidth and an uplink bandwidth are different in a situation that a single carrier is defined for downlink and uplink, respectively. For example, the 3GPP LTE system supports a maximum of 20 MHz and supports only one carrier in uplink and downlink although an uplink bandwidth and downlink bandwidth may be different.

Meanwhile, a multi-carrier system supports carrier aggregation (CA). CA refers to configuring a broadband by aggregating a plurality of narrowband component carriers (CCs). CA supports throughput increased by extending a transmission bandwidth, prevents an increase in cost due to an introduction of a radio frequency (RF) device, and guarantees compatibility with an existing system. Extension of a transmission bandwidth may support a maximum of 100 MHz bandwidth by aggregating five unit carriers each having a 20 MHz bandwidth.

CA may be divided into contiguous CA that aggregation is performed between contiguous carriers and non-contiguous CA that aggregation is performed between non-contiguous carriers. The non-contiguous CA is also called spectrum aggregation.

A band width of unit carriers used for CA may be the same or different. For example, two 20 MHz unit carriers may be used to configure a 40 MHz band. Or, one 20 MHz unit carrier and two 10 MHz unit carriers may be used to configure a 40 MHz band.

Also, a total of bandwidths used for uplink and a total of bandwidths used for downlink may be the same or different. For example, in uplink, three 20 MHz unit carriers are used, totaling a 60 MHz bandwidth, and in downlink, five 20 MHz unit carriers may be sued, totaling a 100 MHz bandwidth. Hereinafter, a multi-carrier system refers to a system supporting a plurality of carriers based on CA.

In each unit carrier, a reception antenna group set for a particular UE may be the same or different. Namely, a reception antenna group set for a particular group in some unit carriers may also be equally applied to a different unit carrier. Or, a reception antenna group set for a UE in some unit carriers may be different from a reception antenna group set for the UE in different unit carriers.

Also, even in a single unit carrier, an application may differ in a fractional frequency reuse (FFR) or subbands. Namely, when a unit carrier is divided to be used by frequency bands a reception antenna group of each frequency band may be different. In this case, uplink antenna information may be transmitted in each frequency band. In this case, in order to reduce an information amount or increase information accuracy, a method in which uplink antenna information is provided only in a particular frequency band (which may be called a reference band) and information regarding only a difference from the information transmitted in the reference band is transmitted in the other remaining frequency bands may be used.

Alternatively, indication information indicating whether or not reception antenna groups in the reference band and the other frequency bands are different may be added. For example, only when the reception antenna groups in the reference band and the other frequency bands are different, the difference between the indication information and the information transmitted in the reference band and the other frequency bands may be transmitted.

Figure 8:
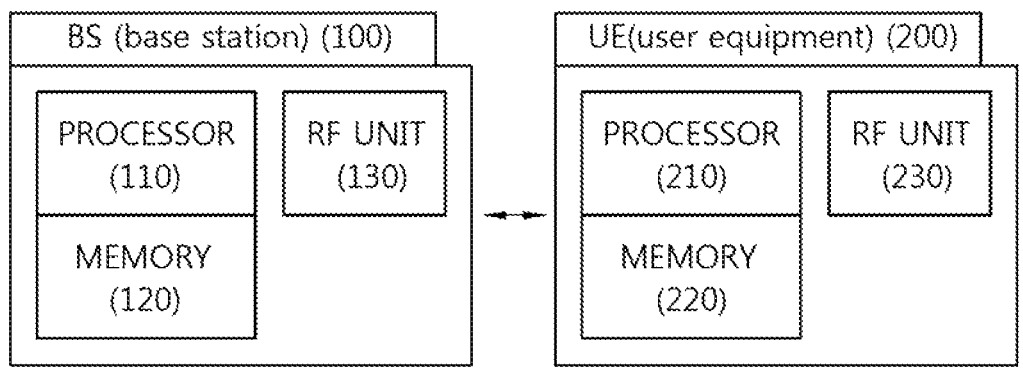
FIG. 8 is a block diagram of a BS and a UE.

FIG. 8 is a block diagram of a base station and a UE.

A BS 100 includes a processor 110, a memory 120, and an RF unit 130. The processor 110 implements a proposed function, process, and/or method. Namely, the processor 110 transmits uplink antenna information and/or downlink antenna information to a UE. The downlink antenna information indicates a transmission antenna through which the BS transmits a downlink signal, and the uplink antenna information indicates a reception antenna of the BS for receiving an uplink signal transmitted by the UE. The memory 120 is connected to the processor 110 and stores various types of information for driving the processor 110. The RF unit 130 is connected to the processor 110 and transmits and/or receives a radio signal.

A UE 200 includes a processor 210, a memory 220, and an RF unit 230. The processor 210 receives downlink antenna information and/or uplink antenna information from a BS, generates downlink channel state information based on the downlink antenna information, controls uplink power based on the uplink antenna information, and transmits an uplink signal. The memory 220 is connected to the processor 210 and stores various types of information for driving the processor 210. The RF unit 230 is connected to the processor 210 and transmits and/or receives a radio signal.

The processors 110 and 210 may include an ASIC (Application-Specific Integrated Circuit), a chip-set, a logical circuit, a data processor, and/or a converter for converting a baseband signal and a radio signal from each other. The memories 120 and 220 may include a ROM (Read-Only Memory), a RAM (Random Access Memory), a flash memory, a memory card, a storage medium, and/or any other storage devices. The RF units 130 and 230 may include one or more antennas for transmitting and/or receiving a radio signal. When the embodiments are implemented by software, the foregoing techniques may be implemented by modules (processes, functions, or the like) performing the foregoing functions. The modules may be stored in the memories 120 and 220 and executed by the processors 110 and 210, respectively. The memories 120 and 220 may be provided within or outside the processors 110 and 210 and may be connected to the processors 110 and 210 through a well-known unit, respectively.

The method and apparatus as described above may be implemented by hardware, software, or a combination thereof. For hardware implementation, the method and apparatus as described above may be implemented by using application specific integrated circuits (ASICs), digital signal processors (DSPs), programmable logic devices (PLDs), field programmable gate arrays (FPGAs), processors, controllers, microprocessors, electronic units, or a combination thereof, designed to perform the foregoing functions. For software implementation, the method and apparatus as described above may be implemented by a module performing the foregoing functions. Software may be stored in a memory unit and executed by a processor. As the memory unit or the processor, various means well known to a person skilled in the art may be employed.

While the present invention has been shown and described in connection with the embodiments, it will be apparent to those skilled in the art that modifications and variations can be made without departing from the spirit and scope of the invention as defined by the appended claims.

The invention claimed is:

1. A method for transmitting a signal by a user equipment (UE) in a distributed antenna system (DAS) in which a plurality of antennas are distributedly disposed in a cell, the method comprising:
receiving uplink antenna information from a base station (BS);
receiving downlink antenna information from the BS;
generating downlink channel state information based on the downlink antenna information;
controlling uplink power based on the uplink antenna information; and
transmitting an uplink signal based on the uplink power control,
wherein the uplink antenna information indicates a reception antenna of the BS for receiving the uplink signal,
wherein the downlink antenna information indicates a transmission antenna through which the BS transmits a downlink signal to the UE,
wherein the uplink antenna information further indicates an antenna indicated by the downlink antenna information and at least one additional antenna, and
wherein each downlink antenna corresponds to a downlink antenna index, each uplink antenna corresponds to an uplink antenna index, and the uplink antenna information includes only one downlink antenna index which corresponds to the at least one additional antenna.

2. The method of claim 1, wherein the uplink signal includes the downlink channel state information.

3. The method of claim 1, wherein the downlink antenna information indicates an antenna indicated by the uplink antenna information and the at least one additional antenna.

4. The method of claim 1, wherein the downlink antenna information includes only one uplink antenna index which corresponds to the at least one additional antenna.

5. The method of claim 1, wherein the UE adjusts uplink transmission power by using an average of path losses with respect to reception antennas indicated by the uplink antenna information.

6. The method of claim 1, wherein the uplink antenna information further includes an antenna index of the reception antenna.

7. The method of claim 1, wherein the uplink antenna information further includes an index of a reference signal transmitted through the reception antenna.

8. A user equipment (UE) comprising:
a radio frequency (RF) unit configured to transmit and receive an RF signal; and
a processor connected to the RF unit,
wherein the processor is configured for:
receiving uplink antenna information from a base station (BS);
receiving downlink antenna information from the BS;
generating downlink channel state information based on the downlink antenna information;
controlling uplink power based on the uplink antenna information; and
transmitting an uplink signal based on the uplink power control,
wherein the uplink antenna information indicates a reception antenna of the BS for receiving the uplink signal,
wherein the downlink antenna information indicates a transmission antenna through which the BS transmits a downlink signal to the UE,
wherein the uplink antenna information further indicates an antenna indicated by the downlink antenna information and at least one additional antenna, and
wherein each downlink antenna corresponds to a downlink antenna index, each uplink antenna corresponds to an uplink antenna index, and the uplink antenna information includes only one downlink antenna index which corresponds to the at least one additional antenna.

9. The UE of claim 8, wherein the uplink signal includes the downlink channel state information.

10. The UE of claim 8, wherein the downlink antenna information indicates an antenna indicated by the uplink antenna information and at least one additional antenna.

11. The UE of claim 8, wherein the downlink antenna information includes only one uplink antenna index which corresponds to the at least one additional antenna.

12. The UE of claim 8, wherein the process is further configured for: adjusting uplink transmission power by using an average of path losses with respect to reception antennas indicated by the uplink antenna information.

13. The UE of claim 8, wherein the uplink antenna information further includes an antenna index of the reception antenna.

14. The UE of claim 8, wherein the uplink antenna information further includes an index of a reference signal transmitted through the reception antenna.

* * * * *